UNITED STATES PATENT OFFICE.

WILLIAM H. DAMON, OF LOS ANGELES, CALIFORNIA.

NON-CUMULATIVE WAX POLISH.

14,930. Specification of Reissued Letters Patent. Reissued Aug. 17, 1920.

No Drawing. Original application filed August 30, 1916, Serial No. 118,594. Renewed July 2, 1917, Serial No. 178,268. Original No. 1,240,545, dated September 18, 1917. Application for reissue filed March 24, 1919. Serial No. 284,837.

*To all whom it may concern:*

Be it known that I, WILLIAM H. DAMON, a citizen of the United States of America, residing at Los Angeles, county of Los Angeles, State of California, have invented a certain new and useful Non-Cumulative Wax Polish; and I do hereby declare the following to be a full, clear, and exact description of the invention, such as will enable others skilled in the art to which it appertains to make and use the same.

This invention relates to a novel and improved non-cumulative wax polish for cleaning and polishing varnished or enameled work or surfaces.

One object of the invention is to provide a novel and improved composition for the purpose specified, which is comparatively inexpensive to manufacture, has no ingredients at all harmful to the finest varnished work, and which is easily applied and adapted to produce quick and lasting results with comparatively little rubbing.

Further objects of the invention are to provide a novel and improved cleaning and polishing composition, which is highly effective for its purpose, and which contains wax but is of such character that the wax is non-cumulative no matter how many different times the composition is applied to varnished or enameled surfaces.

Other objects and advantages of the invention will appear from a careful consideration of the description which follows:

The composition consists of the following ingredients: water, soap, diatomaceous earth, wax and distillate.

The proportions of the ingredients in the composition are approximately as follows:

| | |
|---|---|
| Water | Two gallons. |
| Soap | One pound. |
| Diatomaceous earth | One to two pounds. |
| Wax | Two pounds. |
| Distillate | Two and one-half gallons. |

The water is first heated, then the soap—preferably "Ivory" or other substantially pure soap—is dissolved in the hot water, and then the diatomaceous earth is added and mixed with the soap and water. The wax, preferably paraffin or cerosin, is melted and mixed with the distillate, and then the mixture of the wax and distillate is added to the mixture of the water, soap and diatomaceous earth; and then all of the ingredients are thoroughly mixed together and agitated to form an emulson. The distillate is a petroleum product of from 45 to 60 gravity (Baumé). In use the soap and water clean the varnished surface, the wax hermetically seals and prevents checking and disintegration of the varnish, the diatomaceous earth is a fine abrasive to polish the varnish, and the distillate revivifies the varnish and cuts the wax already on the varnish so that the wax is non-cumulative. The composition may be applied to the varnished surface by rubbing with cotton waste, cloth, chamois skin, etc. Any suitable essential oil or the like may be added to the composition to give it an agreeable odor. The ingredients after being mixed and emulsified as set forth remain mixed and in suspension and form a homogeneous composition which can be used to clean, polish and produce a coating of wax on varnished or enameled surfaces, and is adapted to leave the surfaces with a hard, glossy and perfect finish which is finger-mark proof, acid proof, dust-proof and weather-proof, and which can be washed by water without any bad effect on the finish. The ingredients enumerated, with the exception of the diatomaceous earth, form an emulsion in which the diatomaceous earth is in suspension. A part of the diatomaceous earth has a tendency after a time to settle in the bottom of the container, and it is therefore advisable to shake the contents of the container thoroughly before using so as to bring all the ingredients into a homogeneous mixture.

The best results will be obtained if the ingredients composing my polish are mixed in the proportions stated, although the same may be varied within wide limits without losing the advantages of the composition, as will be understood by those skilled in the art.

It will also be understood that equivalents of the ingredients performing the same functions will suggest themselves to those skilled in the art without departing from the spirit of my invention as claimed.

I claim:

1. The herein described cleaning and polishing composition consisting of water, soap, diatomaceous earth, wax, and light petroleum distillate, substantially in the proportions specified.

2. A composition consisting of two gallons of water, one pound of soap, one to two pounds of diatomaceous earth, two pounds of wax, and two and one-half gallons of light petroleum distillate, substantially as described and for the purposes specified.

3. A polish containing soap, finely powdered mild abrasive of low specific gravity, a light hydrocarbon volatile at ordinary temperatures, and sufficient water to permit the soap and hydrocarbon to be brought into the form of an emulsion and the abrasive into suspension in the emulsion.

4. A cleaning and polishing composition containing soap, a finely powdered mild abrasive, a waxy substance, a fluid hydrocarbon, and sufficient water to permit the soap and hydrocarbon to be brought into the form of an emulsion and the abrasive into suspension in the emulsion.

5. A cleaning and polishing composition containing soap, a finely powdered mild abrasive, wax, a light hydrocarbon, and sufficient water to permit the soap and hydrocarbon to be brought into the form of an emulsion and the abrasive into suspension in the emulsion.

6. A cleaning and polishing composition containing soap, a finely powdered mild abrasive, a waxy substance, light petroleum distillate, and sufficient water to permit the soap and petroleum distillate to be brought into the form of an emulsion and the abrasive into suspension in the emulsion.

7. A polish containing soap, a finely powdered mild abrasive of low specific gravity, a hydrocarbon volatile at ordinary temperatures, and sufficient water to permit the soap and hydrocarbon to be brought into the form of an emulsion and the abrasive into suspension in the emulsion, the water and the hydrocarbon being in relatively large proportions compared with the other ingredients.

In testimony whereof I have affixed my signature.

WILLIAM H. DAMON.